(12) United States Patent
Lurie et al.

(10) Patent No.: US 11,563,705 B2
(45) Date of Patent: Jan. 24, 2023

(54) NOTIFICATION ESCALATION BASED ON VISUAL RECOGNITION

(71) Applicant: International Business Machines Corporation, Armonk, NY (US)

(72) Inventors: Lisa Lurie, New York, NY (US); Steven Ware Jones, Queens, NY (US); Jennifer A. Mallette, Vienna, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 17/034,320

(22) Filed: Sep. 28, 2020

(65) Prior Publication Data
US 2022/0103507 A1 Mar. 31, 2022

(51) Int. Cl.
- *H04L 51/224* (2022.01)
- *G08B 13/196* (2006.01)
- *H04N 7/18* (2006.01)

(52) U.S. Cl.
CPC ...... *H04L 51/224* (2022.05); *G08B 13/19656* (2013.01); *G08B 13/19682* (2013.01); *H04N 7/181* (2013.01)

(58) Field of Classification Search
CPC .................................................. H04L 51/224
See application file for complete search history.

(56) References Cited

U.S. PATENT DOCUMENTS

| | | | |
|---|---|---|---|
| 7,308,246 B2 | 12/2007 | Yamazaki et al. | |
| 8,103,209 B2 | 1/2012 | Jung et al. | |
| 8,350,681 B2 | 1/2013 | Bells | |
| 9,245,190 B2 | 1/2016 | Rosenkrantz | |
| 9,860,204 B2 | 1/2018 | Touloumtzis | |
| 10,469,430 B2 | 11/2019 | Faaborg et al. | |
| 10,573,163 B1 | 2/2020 | Benkreira | |

(Continued)

FOREIGN PATENT DOCUMENTS

| | | |
|---|---|---|
| CN | 108769906 A | 11/2018 |
| TW | I390894 B | 3/2013 |

OTHER PUBLICATIONS

Al-Bakeri et al., "Notification System Based on Face Detection and Recognition: A Novel Approach", International Journal of Computer Science and Information Security (IJCSIS),vol. 14, No. 4, Apr. 2016, 6 pages.

(Continued)

*Primary Examiner* — Roland J Casillas
(74) *Attorney, Agent, or Firm* — Scott Dobson

(57) ABSTRACT

A method can include obtaining notification data for a user, and obtaining a first set of images of the user from one or more cameras. The method can include identifying a first status of the user, and generating a set of notification options based on the first status. The method can include selecting a first notification option, and initiating a first notification by the first notification option. The method can include determining that the user does not acknowledge the first notification, and obtaining a second set of images from the one or more cameras. The method can include identifying a second status of the user, and selecting a second notification option of the set of notification options. The method can include initiating a second notification by the second notification option.

20 Claims, 6 Drawing Sheets

(56) References Cited

U.S. PATENT DOCUMENTS

| | | | |
|---|---|---|---|
| 2010/0311320 A1* | 12/2010 | Jung | H04W 4/06 |
| | | | 455/3.01 |
| 2016/0366085 A1* | 12/2016 | Touloumtzis | H04L 67/55 |
| 2019/0114901 A1* | 4/2019 | Kusens | G08B 25/00 |
| 2021/0373919 A1* | 12/2021 | Davenport | H04M 1/72457 |

OTHER PUBLICATIONS

Anonymous, "Method and System for IoT Message Translation and Transformation Utilizing Escalation Patterns", An IP.com Prior Art Database Technical Disclosure, IP.com No. IPCOM000260172D, IP.com Electronic Publication Date: Oct. 28, 2019, 7 pages.

Mell et al., "The NIST Definition of Cloud Computing", Recommendations of the National Institute of Standards and Technology, Sep. 2011, 7 pages.

Patents Act 1977: Combined Search and Examination Report Under Sections 17 and 18(3). Application No. GB2113290.7, Filing Date: Feb. 17, 2021, dated Mar. 17, 2022, 6 Pages.

* cited by examiner

NOTIFICATION ESCALATION BASED ON VISUAL RECOGNITION

BACKGROUND

The present disclosure relates to notifications, and more specifically, to dynamic notifications.

Notifications, such as messages and alerts directed to a user, can be received through a plurality of devices and in a variety of manners. For example, an employee in an office building can receive an audible alert through an office building public address system, a visual message notification through the employee's computer screen, and/or a haptic alert through the employee's mobile phone. In some instances, such an employee can select a manner of receiving notifications.

SUMMARY

According to embodiments of the present disclosure, a method can include obtaining notification data for a user. The method can include obtaining a first set of images of the user from one or more cameras. The method can include identifying, based on the first set of images, a first status of the user. The method can include generating a set of notification options based, at least in part, on the first status of the user. The method can include selecting a first notification option of the set of notification options. The method can include initiating, in response to the selecting, a first notification by the first notification option. The method can include determining, at a first time, that the user does not acknowledge the first notification. The method can include obtaining, in response to the determining, a second set of images of the user from the one or more cameras. The method can include identifying, based on the second set of images, a second status of the user. The method can include selecting at least one second notification option of the set of notification options. The method can include initiating, in response to the selecting the at least one second notification option, at least one second notification by the at least one second notification option.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
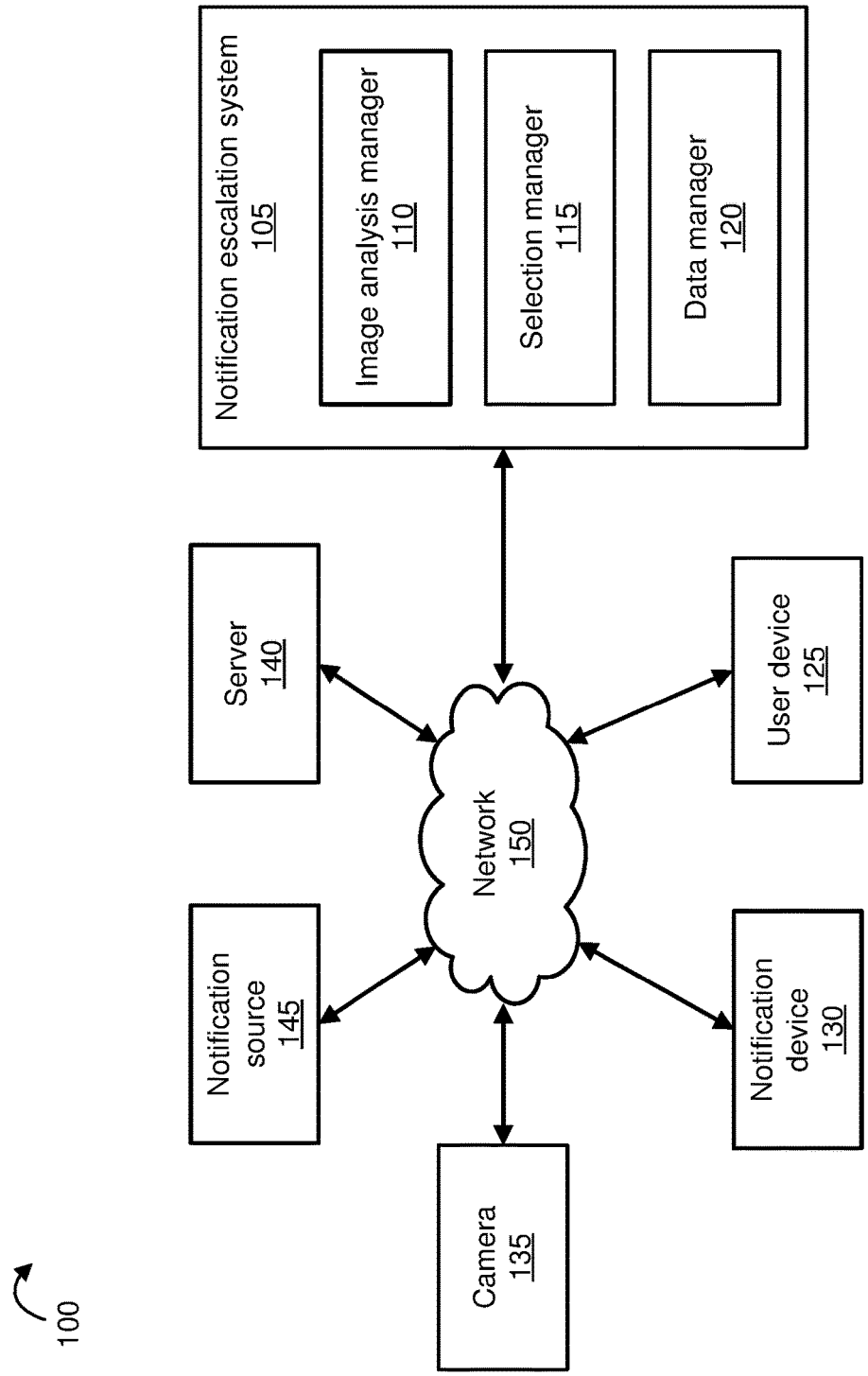
FIG. 1 depicts an example computing environment having a notification escalation system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to notifications; more particular aspects relate to notification escalation based on visual recognition. While the present disclosure is not necessarily limited to such applications, various aspects of the disclosure may be appreciated through a discussion of various examples using this context.

Notifications, such as messages and alerts directed to a user, can be received through a plurality of devices and in a variety of manners. For example, an employee in an office building can receive an audible alert through an office building public address system, a visual message notification through the employee's computer screen, and/or a haptic alert through the employee's mobile phone. In some instances, a user can select a manner of receiving notifications. For example, a user in a quiet setting can choose to only receive visual notifications on the user's laptop computer screen, so as not to disturb others. In another example, a user in a loud or active environment can choose to receive haptic alerts (e.g., physical vibrations) from the user's mobile phone to facilitate drawing the user's attention away from the environment and to the mobile phone.

Since users can frequently change their locations and environments, an effective manner for a user to receive a notification can likewise change. In some instances, neither the user nor an entity attempting to notify the user may realize a most effective manner to notify the user at a given time. For example, a user who accidentally left his or her mobile phone on a silent mode may not realize that a text message displayed on the user's laptop computer screen may be a more effective notification than a text message to the user's mobile phone. In another example, a coworker trying to reach an employee who is in a hallway may not realize that an audible message through a public address system may be a more effective notification than a phone call to the employee. In situations where time is of the essence, such as when urgent medical attention is needed or when a person is at risk of injury, efficiently determining an effective manner to notify a user can be imperative.

To address these and other challenges, embodiments of the present disclosure include a notification escalation system. In some embodiments, the notification escalation system can employ visual recognition to identify one or more notification options for notifying a user. More specifically, the notification escalation system can employ a set of cameras to identify a user's status. Based on such status, the notification escalation system can generate a set of notification options for notifying the user. Additionally, the notification escalation system can cyclically initiate notifications according to the set of notification options, accounting for changes to the user's visually-identified status. In some embodiments, the notification escalation system can continue such a cyclical initiation of notifications until it obtains acknowledgment data or until an acknowledgment-threshold time is exceeded.

Thus, embodiments of the present disclosure can automatically generate notifications that are tailored to a user's status. Additionally, by employing visual recognition to identify a user's status, embodiments of the present disclosure can provide increased options for notifying the user. Accordingly, embodiments of the present disclosure can improve an ability to efficiently determine an effective manner of notifying a user.

Turning to the figures, FIG. 1 illustrates a computing environment 100 that includes one or more of each of a notification escalation system 105, user device 125, notification device 130, camera 135, notification source 145, server 140, and/or a network 150. In some embodiments, at least one notification escalation system 105, user device 125, notification device 130, camera 135, notification source 145, and/or server 140 can exchange data with at least one other through the at least one network 150. For example, in some embodiments, at least one notification escalation system 105 can exchange data with at least one user device 125 through the at least one network 150. One or more of each of the notification escalation system 105, user device 125, notification device 130, camera 135, notification source 145, server 140, and/or network 150 can include a computer system, such as the computer system 401 discussed with respect to FIG. 4.

In some embodiments, the notification escalation system 105 can be included in software installed on a computer system of at least one of the user device 125, notification device 130, camera 135, notification source 145, and/or server 140. In an example, in some embodiments, the notification escalation system 105 can be included as a plug-in software component of software installed on a user device 125. The notification escalation system 105 can include program instructions implemented by a processor, such as a processor of the server 140, to perform one or more operations discussed with respect to FIGS. 2 and 3.

In some embodiments, the notification escalation system 105 can include one or more modules, such as an image analysis manager 110, a selection manager 115, and/or a data manager 120. In some embodiments, the image analysis manager 110, selection manager 115, and/or data manager 120 can be integrated into a single module. In some embodiments, the image analysis manager 110 can be configured to perform image analysis on images obtained by the notification escalation system 105. In some embodiments, the image analysis manager 110 can include a trained model (not shown) configured to identify and/or categorize image features. In some embodiments one or more of the image analysis manager 110, selection manager 115, and/or the data manager 120 can include program instructions implemented by a processor, such as a processor of the server 140 to perform one or more operations discussed with respect to FIGS. 2 and 3. For example, in some embodiments, the image analysis manager 110 can include program instructions to perform operations 215, 220, 240, and/or 245, FIG. 2. In some embodiments, the selection manager 115 can include program instructions to perform operations 225-235, FIG. 2. In some embodiments, the data manager 120 can include program instructions to perform operations 205, 210, 245, and/or 250, FIG. 2.

In some embodiments, the notification escalation system 105 can include and/or employ tools for facial recognition analysis, audio analysis, and/or natural language processing. For example, in some embodiments, the data manager 120 can be configured to employ natural language processing technology to identify notification elements (e.g., a time, name, or location) included in text notification data. In some embodiments, the data manager can be further configured to employ audio analysis technology (e.g., speech-to-text technology) to identify notification elements included in audio notification data, such as a voicemail message.

In some embodiments, user device 125 can include an electronic device of a user, such as a computer-based wristwatch (e.g., a smart watch), mobile phone, pager, laptop computer, desktop computer, and the like. Thus, the user device 125 can include user-interface components (not shown), such as a screen, touchscreen, microphone, and/or keyboard. In some embodiments, the user device 125 can be configured to provide haptic, audible, and/or visible notifications.

In some embodiments, notification device 130 can include an electronic device of a bystander or an entity other than a user. For example, in some embodiments, notification device 130 can include an office public address system or a speaker system for a pedestrian crosswalk. In some embodiments, notification device 130 can include an electronic device of a bystander such as a computer-based wristwatch (e.g., a smart watch), mobile phone, pager, laptop computer, desktop computer, and the like. Thus, in these embodiments, the notification device 130 can include user-interface components (not shown), such as a screen, touchscreen, microphone, and/or keyboard. In some embodiments, the notification device 130 can be configured to provide haptic, audible, and/or visible notifications.

In some embodiments, the one or more cameras 135 can include stationary cameras installed in public spaces and/or office spaces for capturing images and monitoring activity in an environment. For example, the one or more cameras 135 can include surveillance cameras. By employing such cameras, embodiments of the present disclosure can analyze a user's environment and identify a user's location with respect to other people, objects, and/or devices in such environment. Thus, embodiments of the present disclosure can obtain a significant amount of data for generating notification options and a timing scheme (discussed in more detail below). In this way, embodiments of the present disclosure can efficiently identify effective notification options for a user.

In some embodiments, the notification source 145 can include a system or device from which the notification escalation system 105 obtains notification data. For example, in some embodiments, the notification source 145 can include a system such as a public alert/warning system, an office messaging system, and the like. In some embodiments, the notification source 145 can be a communication device such as a computer, mobile phone, and the like. In an example, the notification source 145 can include a mobile phone from which a coworker attempts to transmit a text message to a user.

In some embodiments, the server 140 can be a web server that can store data and/or software employed by the notification escalation system 105. In some embodiments, the network 150 can be a wide area network (WAN), a local area network (LAN), the internet, or an intranet. In some embodiments, the network 150 can be substantially similar to, or the same as, cloud computing environment 50 discussed with respect to FIG. 5.

Figure 2:
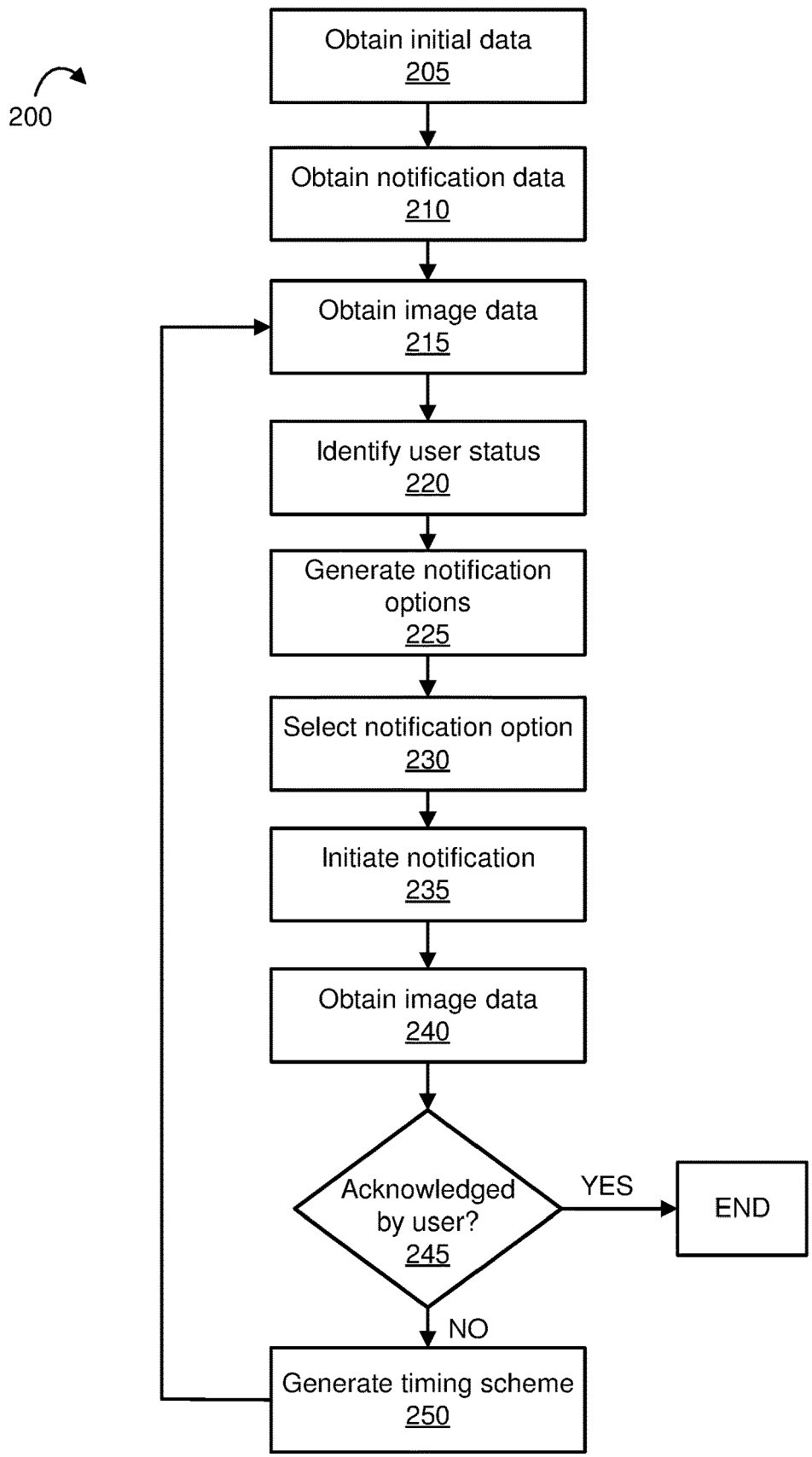
FIG. 2 depicts a flowchart of an example method for performing notification escalation, in accordance with embodiments of the present disclosure.

FIG. 2 illustrates a flowchart of an example method 200 for performing notification escalation, in accordance with embodiments of the present disclosure. Method 200 can be performed by a notification escalation system, such as notification escalation system 105, FIG. 1.

In operation 205, the notification escalation system can obtain initial data from an entity such as a user or a programmer of the notification escalation system. In some embodiments, the initial data can include a set of one or more notification options. A notification option can refer to a manner of transmitting a notification to a user. For example, in some embodiments, a set of notification options can include a haptic alert (e.g., activating a vibration function of a user device such as a mobile phone, smart watch, pager, and the like); a visual alert (e.g., displaying a notification on a screen of a user device and/or illuminating one or more light-emitting diodes (LED's) of a user device); and an audible alert (e.g., activating an emission of one or more sounds from a user device such as a mobile phone and/or headphones/earphones communicatively connected to a mobile phone).

In some embodiments, a set of notification options can include alerting a bystander. A bystander can refer to a person proximate a user (e.g., a person within a range of approximately 2 meters (m) to 6 m of the user). In some embodiments, a bystander can refer to a person included in an image of a user captured by a camera. For example, a public surveillance camera can capture an image of a user standing at a street corner and a pedestrian bystander approaching the street corner. Thus, in some embodiments, alerting such a bystander can include a method such as calling or transmitting a message to a notification device (e.g., mobile phone, smart watch, pager, and the like) of the bystander such that the bystander can prompt the user to acknowledge a notification.

In some embodiments, a set of notification options can include emitting an audible message through a speaker that is distinct from and not operatively connected to a user device, such as a loudspeaker of a public address system in an environment where the user is located. For example, in some embodiments, a pedestrian signal at a street crossing can include a speaker. In these embodiments, the notification escalation system can employ such a speaker to emit an audible message for a user (e.g., a message that a pedestrian user is dangerously approaching one or more moving vehicles).

In some embodiments, the initial data obtained in operation 205 can include timing data. In some embodiments, timing data can include an acknowledgment-time threshold. An acknowledgment-time threshold can refer to a predetermined threshold time for a user to acknowledge a notification. For example, in some embodiments, timing data can include a default five-minute time period for a doctor to respond to a page or text message. In some embodiments, timing data can include a minimum step time. A step time can refer to a time interval between successive notifications initiated by the notification escalation system. For example, in some embodiments, the notification escalation system can be configured to wait at least 1 minute between initiating a first notification and initiating a second notification. In some embodiments, such timing data can be determined by an entity such as a user or a programmer of the notification escalation system. In some embodiments, the notification escalation system can select such timing data from a stored data set. For example, in some embodiments, a stored data set can include a first acknowledgment-time threshold of 2 minutes for an urgent notification and a second acknowledgment time threshold of 5 minutes for a non-urgent notification. In this example, the notification escalation system can select an acknowledgment-time threshold from the stored data set based on a level of urgency (i.e., urgent or non-urgent) associated with a notification.

In some embodiments, the initial data obtained in operation 205 can include training data for training the notification escalation system to perform image analysis. For example, in some embodiments, operation 205 can include training a machine-learning algorithm of the notification escalation system with data, such as facial images and/or images of scenarios (e.g., images of two people talking, images of a person looking at a screen of a device such as a smart watch, images of a person carrying a mobile phone and/or pager, and the like). Such training can include performing supervised, unsupervised, or semi-supervised training. Additionally, such training can allow such the machine-learning algorithm to generate a trained model configured to identify one or more people and/or image characteristics that indicate a user status (discussed further, below).

According to embodiments for the present disclosure, machine-learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In operation 210, the notification escalation system can obtain notification data from a notification source, such as notification source 145, FIG. 1. In some embodiments, notification data can include information to be transmitted to a user. For example, in some embodiments, notification data can include a text or voice message generated by an entity such as an administrative assistant for a user such as a doctor. In some embodiments, notification data can include a text or voice message generated by an entity such as an automated alerting system configured to alert a user such as a pedestrian near a traffic intersection or construction zone. In some embodiments, notification data can include one or more elements, such as a name, time, time period, degree of urgency, and/or destination. In an example, notification data can include the text message, "Please report to room 804B for your 10:30 AM appointment." In this example, the notification data includes a destination (i.e., room 804B) for the user and a time for the user's performance.

In operation 215, in response to obtaining the notification data in operation 210, the notification escalation system can obtain image data. The image data can be obtained from at least one camera, such as camera 135, FIG. 1. Image data can include sets of one or more images of an environment where a user is located. In some embodiments, image data can include one or more images of at least one of a user, a bystander, a user device, and/or a notification device. In some embodiments, image data can include metadata such as a time and/or location where an image is captured.

In operation 220, the notification escalation system can identify a user status based on the image data obtained in operation 215. In some embodiments, operation 220 can include the notification escalation system employing image analysis technology (e.g., a trained machine-learning model) to identify a user status from the image data. A user status can include information regarding a user's location, activity/actions in which the user is engaged, one or more devices in a user's possession, and/or a user's proximity to one or more bystanders. For example, in some embodiments, the notification escalation system can identify that a user is waiting for an elevator on the third floor of a building based on images from a camera in that location showing the user remaining in front of elevator doors for a period of time. In another example, in some embodiments, the notification escalation system can identify that a user is reviewing information on a mobile phone based on camera images of the user looking at an illuminated screen of such a mobile phone. In another example, in some embodiments, the notification escalation system can identify that a user is proximate a bystander who is working on a computer based on such a bystander and computer located within a field of view of a camera; thus, the bystander and computer are included in camera images with the user. Further in this example, the notification escalation system can identify the bystander as a coworker of the user by performing facial recognition on such images.

In some embodiments, operation 220 can include the notification escalation system identifying a status of a user at successive times. For example, in some embodiments, the notification escalation system can identify, at a first time, that a user is walking down a hallway in a first direction. Further in this example, at a subsequent second time, the notification escalation system can identify that the user is running down the hallway in a second, opposite direction. As discussed below, in some embodiments, such a changed status can indicate that a user acknowledges a notification.

In operation 225, the notification escalation system can generate a set of one or more notification options based, at least in part, on a user status obtained in operation 220. In this disclosure, a count of notification options can refer to a number of notification options in a set of notification options. For example, in some embodiments, in operation 220, the notification escalation system can identify that a user is wearing headphones and typing on a laptop computer in a vicinity of a bystander who has a mobile phone. In this example, the notification escalation system can generate a set of notification options that includes a count of at least three notification options, such as: (1) transmitting a visual alert to the user's laptop computer; (2) transmitting an audible alert that can be received by user's headphones (e.g., transmitting an audible alert to a mobile device of the user, which may be communicatively connected to the user's headphones); and (3) alerting the bystander by transmitting a message to the bystander's mobile phone. In some embodiments, the notification escalation system can be configured to prioritize the generated set of notification options. Continuing with the example above, the notification escalation system can prioritize notification option (1) and/or notification option (2) over notification option (3), so as not to disturb the bystander unless the user does not acknowledge a notification by notification options (1) and/or (2).

In some embodiments, operation 225 can include the notification escalation system selecting an acknowledgment-time threshold for the one or more notification options based, at least in part, on notification data obtained in operation 210. For example, continuing with the example above, notification data obtained by the notification escalation system can include the message, "The board meeting starts in 10 minutes, please call the front desk immediately." Continuing with this example, the notification escalation system can employ natural language processing technology to identify elements such as the 10-minute time period and the request to call immediately. Based on these elements of the notification data indicating a degree of urgency, the notification escalation system can select a threshold such as a 5-minute acknowledgment-time threshold. Accordingly, by such a selection, the notification escalation system can designate a maximum time of 5 minutes to employ the set of 3 notification options and obtain acknowledgment data from the user. Acknowledgment data (discussed further, below) can refer to information indicating that a user has received a notification and/or is performing an activity corresponding to a notification. In some embodiments, an acknowledgment-time threshold can be selected by an entity such as a programmer or a user of the notification escalation system.

In operation 230, the notification escalation system can select at least one notification option. In some embodiments, such selecting can be based, at least in part, on a user status, a priority associated with a notification option, a previously selected notification option, and/or an acknowledgment-time threshold. In some embodiments, operation 230 can include the notification escalation system selecting a notification option of the set of notification options generated in operation 225. For example, in some embodiments, in operation 225, the notification escalation system can generate a set of three notification options, where the first notification option has a highest priority and the third notification option has a lowest priority. Additionally, in this example, the set of three notification options can have a corresponding 10-minute acknowledgment-time threshold (e.g., the notification escalation system can designate a maximum time of 10 minutes to employ the set of 3 notification options and obtain acknowledgment data from the user). In this example, the notification escalation system can, select, at a first time, the first notification option based on its highest priority. Continuing with this example, the notification escalation system can select, at a second time, the second notification option in response to determining that a user did not respond to a notification by the first notification option. Continuing with this example, the notification escalation system can select, at a third time, all three notification options in the set of notification options in response to determining that a remaining time of the 10-minute acknowledgment-time threshold is less than a minimum remaining time (e.g., three minutes of the 10-minute acknowledgment time threshold remain, which is less than a 5-minute minimum-remaining-time threshold). Accordingly, embodiments of the present disclosure can increase a likelihood that a user will acknowledge a notification.

In operation 235, the notification escalation system can initiate at least one notification. In some embodiments, the notification escalation system can perform operation 235 in response to selecting at least one notification option in operation 230. Initiating a notification can include the notification escalation system issuing a command that allows at least one user device (e.g., user device 125, FIG. 1) and/or at least one notification device (e.g., notification device 130, FIG. 1) to perform an action in accordance with a notification option. For example, in some embodiments, operation 235 can include the notification escalation system issuing a command that allows a user's smart watch to vibrate, in accordance with a notification option. In this example, such vibration can prompt a user who has been unresponsive to phone calls to view a message on the user's smart watch. In another example, in some embodiments, operation 235 can include the notification escalation system issuing a command that allows a laptop computer to conspicuously display a text message on its screen, in accordance with a notification option. In this example, such a visual display can prompt a user who has been unresponsive to a text message to receive the text message on the user's laptop computer. In another example, in some embodiments, operation 235 can include the notification escalation system issuing a command that allows a public address system of a user's office building to emit an audible message for the user, in accordance with a notification option. In another example, in some embodiments, operation 235 can include the notification escalation system simultaneously issuing the commands discussed in the examples above, in accordance with a set of notification options.

In operation 240, in response to initiating a notification in operation 235, the notification escalation system can obtain image data. Such image data can be obtained in a manner substantially similar to that described in operation 215. In some embodiments, operation 240 can include the notification escalation system obtaining sets of one or more images over a plurality of time periods. For example, operation 215 can include the notification escalation system obtaining, between 9 AM and 9:05 AM, a first set of images of an environment where a user is located and obtaining, between 9:15 AM and 9:20 AM, a second set of images of an environment where the user is located. In this way, the notification escalation system can determine, based on the user's actions captured in the images, whether a user acknowledges a first or subsequent notification.

In operation 245, the notification escalation system can determine whether a user acknowledges a notification. In some embodiments, the notification escalation system can determine that a user acknowledges a notification if the notification escalation system obtains acknowledgment data. In these embodiments, the notification escalation system can determine that a user does not acknowledge a notification if the notification escalation system does not obtain acknowledgment data. Acknowledgment data can refer to information that indicates that a user has received a notification, is performing an activity that corresponds to a notification, or has completed an activity that corresponds to a notification. For example, in some embodiments, acknowledgment data can include a confirmation message from a user device that confirms that a user has read a notification message. In some embodiments, a user can elect to transmit such a confirmation message to the notification escalation system through the user device.

In some embodiments, acknowledgment data can include a determination by the notification escalation system that a user is performing/has completed an activity that corresponds to a notification. In these embodiments, such a determination can be based on an analysis by the notification escalation system of image data obtained in operation 240. For example, in some embodiments, such image data can show that a user stops walking, retrieves the user's mobile phone, and views and illuminated screen of the mobile phone. In this example, the image data can indicate to the notification escalation system that the user is a reading a received text-message notification. Thus, in this example, the notification escalation system can determine that the user is performing an activity that corresponds to a notification. In another example, in some embodiments, the image data can show that a user is approached by a bystander and is talking to the bystander. In this example, the image data can indicate to the notification escalation system that the bystander is communicating a notification message to the user and/or prompting the user to retrieve a notification. Thus, in this example, the notification escalation system can determine that the user is performing an activity that corresponds to a notification. In some embodiments, the image data can show that a user is at a destination specified in a notification message. In these embodiments, the notification escalation system can determine that the user has completed an activity that corresponds to the notification message.

In some embodiments, acknowledgment data can be selected from the group consisting of (1) a confirmation message from a user device and (2) image data that indicate to the notification escalation system that a user has completed an activity that corresponds to a notification. Accordingly, in these embodiments the notification escalation system can determine that it does not receive acknowledgment data unless it receives at least one of the these two types of data. For example, the notification escalation system can initiate a notification requesting that a user go to room A. In this example, the notification escalation system can consider a received confirmation message from the user to be acknowledgment data indicating that the user acknowledges the notification. Alternatively, in this example, the notification escalation system can obtain a subsequent image of the user standing in room A, and it can consider the image to be acknowledgment data indicating that the user acknowledges the notification. Alternatively, in this example, the notification escalation system can obtain subsequent images of the user proceeding toward room A or being unresponsive to the notification, and it can consider such images to not be acknowledgement data. In these instances, the notification escalation system can determine that the user does not acknowledge the notification.

In some embodiments, the notification escalation system can only consider to be acknowledgment data image data that indicate that a user has completed an activity that corresponds to a notification. For example, in a case in which the notification escalation system initiates a notification requesting that a user go to room A, a user's confirmation message to the notification escalation system would not constitute acknowledgement data. However, obtaining a subsequent image of the user standing in room A would constitute acknowledgment data to the notification escalation system. Accordingly, the notification escalation system can be configured to continue method 200 until it obtains an indication that a user has completed an activity that corresponds to a notification.

In operation 245, if the notification escalation system determines that a user does not acknowledge a notification, then the notification escalation system can proceed to operation 250. Alternatively, if the notification escalation system determines that a user acknowledges a notification, then method 200 can end (e.g., the notification escalation system can refrain from initiating any subsequent notifications and end method 200). Additionally, if the notification escalation system determines that an acknowledgment-time threshold is exceeded, then method 200 can end.

In operation 250, the notification escalation system can generate and employ a timing scheme for initiating one or more subsequent notifications. A timing scheme can refer to a process for implementing a step time (e.g., a time interval between successive notifications initiated by the notification escalation system). In some embodiments, operation 250 can include the notification escalation system calculating such a step time. In some embodiments, such a calculation can include the notification escalation system dividing an acknowledgment-time threshold by a count of notification options included in a set of notification options.

In some embodiments a timing scheme generated in operation 250 can include one or more of the following. In the case that the image data obtained in operation 240 indicates that a user performs no activity that corresponds to a notification initiated in operation 235, the notification escalation system can proceed to operation 215 in response to allowing one step time to pass. In the case that the image data obtained in operation 240 indicates that a user performs an activity that corresponds to a notification initiated in operation 235 (e.g., the user is proceeding toward a destination specified in a notification message), the notification escalation system can proceed to operation 215 in response to allowing two-step times to pass. By employing such a timing scheme, embodiments of the present disclosure can allow a user who appears to be responsive to a notification additional time to acknowledge the notification. In this way, embodiments of the present disclosure can reduce a number of initiated notifications, which can reduce a likelihood of burdening a user by excessively notifying the user.

Figure 3:
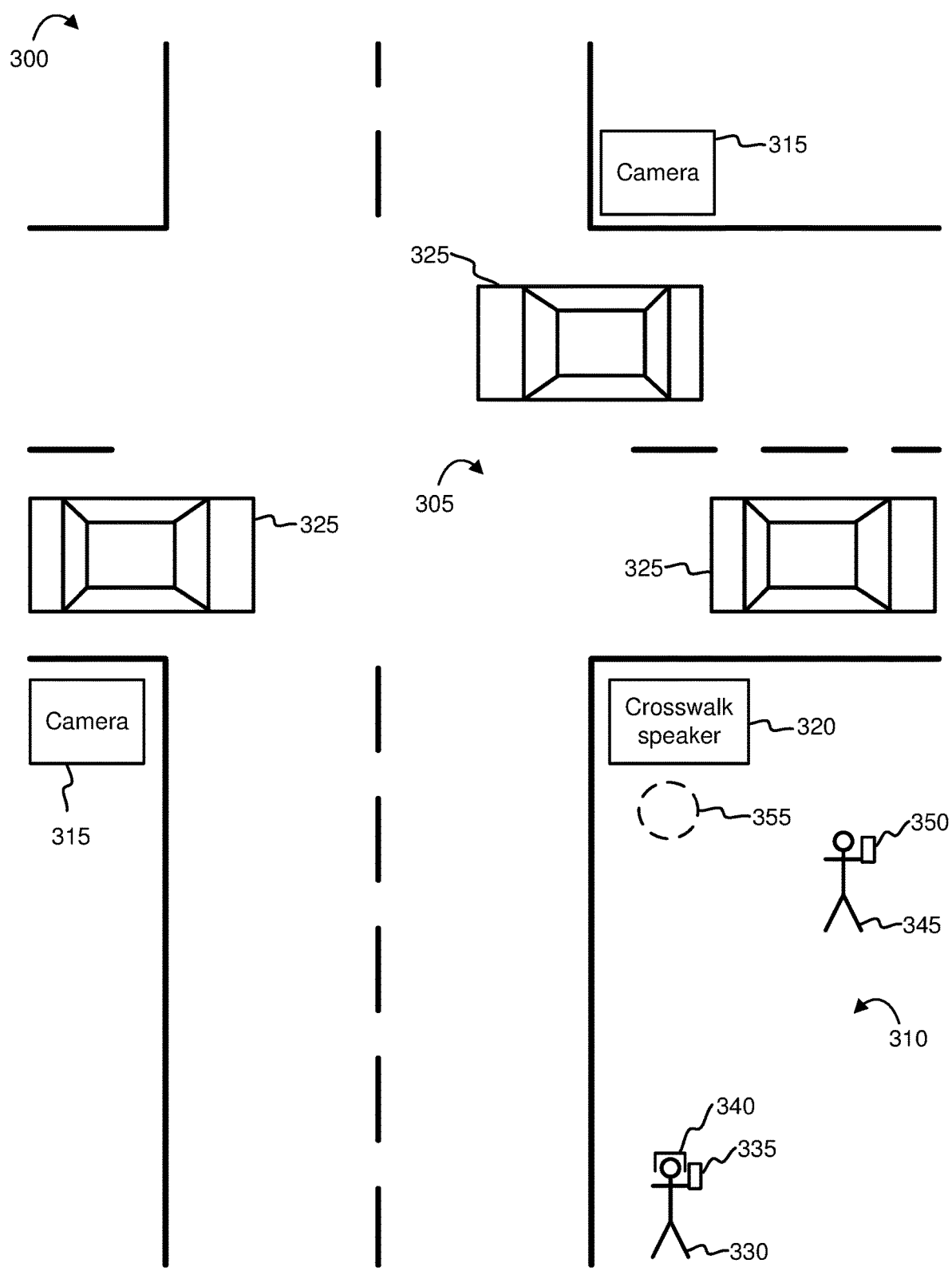
FIG. 3 depicts an example environment in which a notification escalation system can be employed, in accordance with embodiments of the present disclosure.

FIG. 3 depicts an example environment 300 in which a notification escalation system can be employed, in accordance with embodiments of the present disclosure. (The distances and object sizes shown in FIG. 3 are not to scale). Environment 300 includes a plurality of moving vehicles 325 at a street intersection 305. Environment 300 further includes public surveillance cameras 315 and a crosswalk speaker 320. The public surveillance cameras 315 and the crosswalk speaker 320 can be operatively connected to an independent public safety system (not shown) configured to alert pedestrians in environment 300 of potential traffic hazards. The crosswalk speaker 320 can be configured to emit audible messages, such as messages regarding when it is safe for pedestrians to cross the street.

Environment 300 includes a user 330 and a bystander 345 on a sidewalk 310. In this example, the independent public safety system can predict, by employing methods beyond the scope of this disclosure, that the user is proceeding dangerously toward the intersection 305 and should be issued the warning message, "You are approaching an intersection; beware of oncoming traffic." To manage the issuance of such a message, the independent public safety system can employ a notification escalation system (not shown) according to embodiments of the present disclosure.

The notification escalation system can obtain the warning message and image data from cameras 315. Based on image data obtained at a first time, the notification escalation system can identify that the user 330 is carrying a mobile phone 335 and wearing headphones 340. In response, the notification escalation system can initiate a text notification to the user's mobile phone 335 that includes the warning message. Additionally, the notification escalation system can initiate a haptic alert to the user's mobile phone 335 to prompt the user 330 to view the text notification. Based on image data obtained at a second time, the notification escalation system can determine that the user 330 did not acknowledge the text notification. Based on image data obtained at a third time, the notification escalation system can identify that the user 330 has moved to location 355. Additionally, based on such image data, the notification escalation system can identify that the user 330 is proximate the bystander 345, who is carrying a mobile phone 350, and the crosswalk speaker 320. In response, the notification escalation system can initiate the notifications discussed above as well as (1) an audible notification emitted from the crosswalk speaker 320 that includes the warning message and (2) a text notification to the bystander's mobile phone 350 requesting that the bystander 345 alert the user 330. Accordingly, embodiments of the present disclosure can allow an increased set of notification options for notifying a user.

Figure 4:
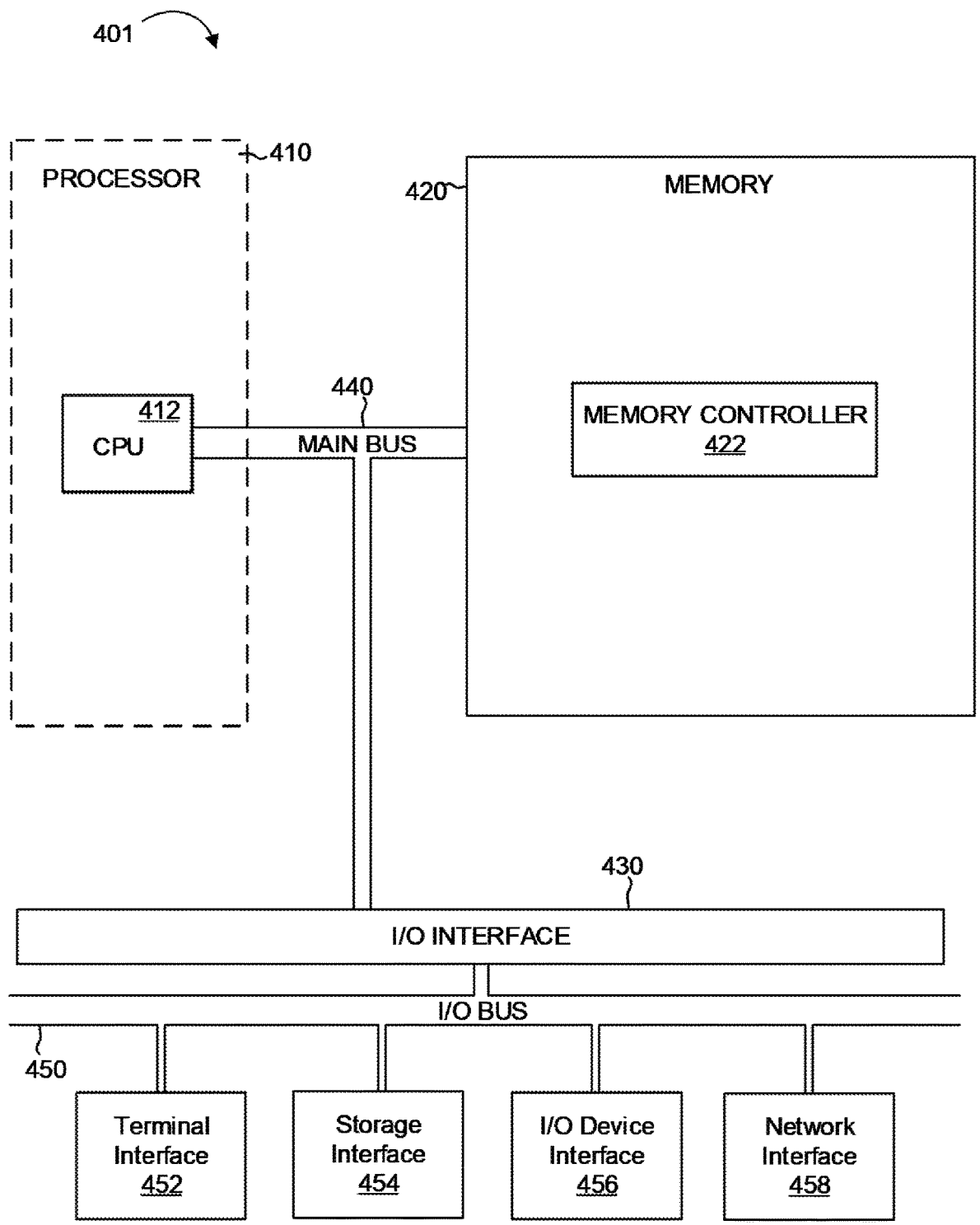
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401 including but not limited to the Memory 420, the Processor 410, and the I/O Interface 430 can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
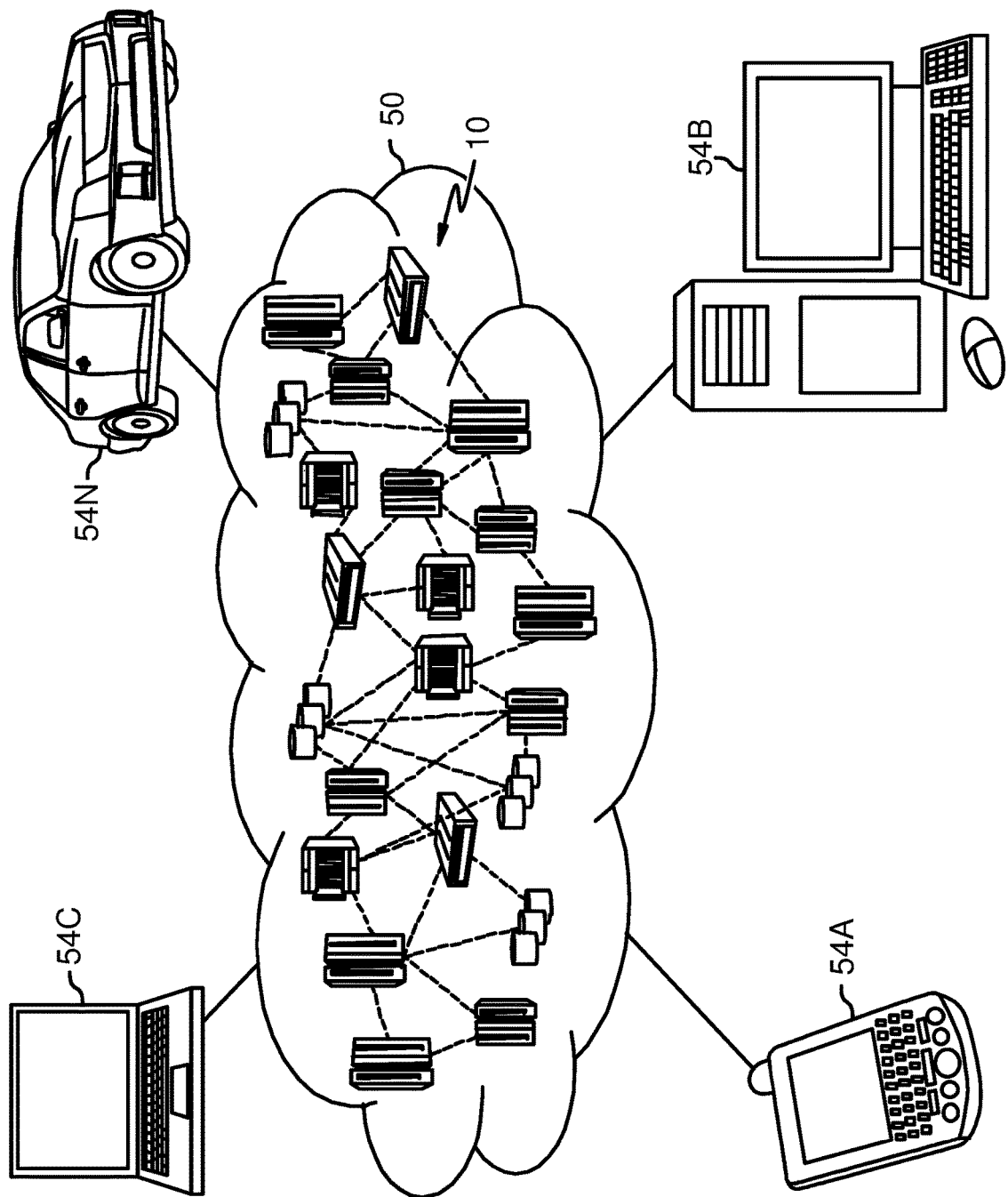
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
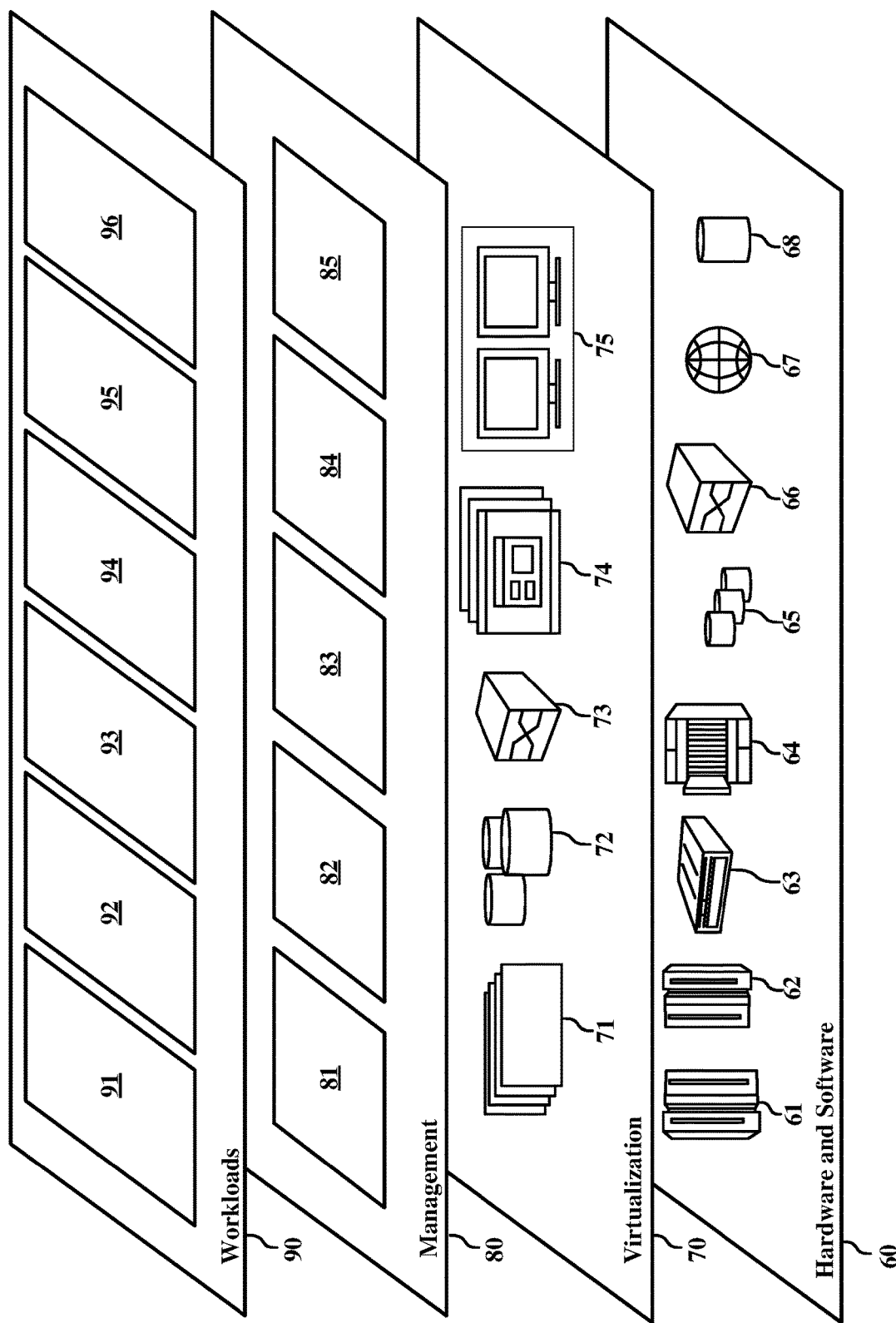
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and notification escalation logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining notification data for a user;
    obtaining a first set of images of the user from one or more cameras, the one or more cameras independent of the user and a user device of the user;
    identifying, based on the first set of images, a first status of the user;
    generating a set of notification options based, at least in part, on the first status of the user;
    selecting a first notification option of the set of notification options, the first notification option associated with the user device of the user;
    initiating, in response to the selecting, a first notification by the first notification option;
    determining, at a first time, that the user does not acknowledge the first notification;
    obtaining, in response to the determining, a second set of images of the user from the one or more cameras independent of the user and the user device;
    identifying, based on the second set of images, a second status of the user;
    selecting at least one second notification option of the set of notification options, the second notification option selected for one or more devices independent of the user device to transmit a notification associated with the first notification; and
    initiating, in response to the selecting the at least one second notification option, at least one second notification by the at least one second notification option.

2. The computer-implemented method of claim 1, wherein the one or more cameras are surveillance cameras for an environment in which the user is located.

3. The computer-implemented method of claim 1, further comprising calculating a step time, and wherein the step time is a time interval between the initiating the first notification and the initiating the at least one second notification.

4. The computer-implemented method of claim 3, wherein the notification data includes an acknowledgment-time threshold; and
    wherein the calculating the step time comprises dividing the acknowledgment-time threshold by a count of notification options included in the set of notification options.

5. The computer-implemented method of claim 1, further comprising determining, at a second time subsequent to the first time, that the user acknowledges the at least one second notification; and
    refraining from initiating a third notification in response to the determining at the second time.

6. The computer-implemented method of claim 5, wherein the notification data includes a destination for the user; and wherein the determining that the user acknowledges the at least one second notification comprises determining, based on a third set of images of the user obtained from the one or more cameras, that the user is proceeding toward the destination.

7. The computer-implemented method of claim 1, wherein the set of notification options includes initiating a notification to a notification device of a bystander, the bystander included in the second set of images.

8. A system comprising:
a processor; and
a memory in communication with the processor, the memory containing program instructions that, when executed by the processor, are configured to cause the processor to perform a method for generating a summary text composition, the method comprising:
obtaining notification data for a user;
obtaining a first set of images of the user from one or more cameras, the one or more cameras independent of the user and a user device of the user;
identifying, based on the first set of images, a first status of the user;
generating a set of notification options based, at least in part, on the first status of the user;
selecting a first notification option of the set of notification options, the first notification option associated with the user device of the user;
initiating, in response to the selecting, a first notification by the first notification option;
determining, at a first time, that the user does not acknowledge the first notification;
obtaining, in response to the determining, a second set of images of the user from the one or more cameras independent of the user and the user device;
identifying, based on the second set of images, a second status of the user;
selecting at least one second notification option of the set of notification options, the second notification option selected for one or more devices independent of the user device to transmit a notification associated with the first notification; and
initiating, in response to the selecting the at least one second notification option, at least one second notification by the at least one second notification option.

9. The system of claim 8, wherein the one or more cameras are surveillance cameras for an environment in which the user is located.

10. The system of claim 8, further comprising calculating a step time, and
wherein the step time is a time interval between the initiating the first notification and the initiating the at least one second notification.

11. The system of claim 10, wherein the notification data includes an acknowledgment-time threshold; and
wherein the calculating the step time comprises dividing the acknowledgment-time threshold by a count of notification options included in the set of notification options.

12. The system of claim 8, further comprising determining, at a second time subsequent to the first time, that the user acknowledges the at least one second notification; and
refraining from initiating a third notification in response to the determining at the second time.

13. The system of claim 12, wherein the notification data includes a destination for the user; and
wherein the determining that the user acknowledges the at least one second notification comprises determining, based on a third set of images of the user obtained from the one or more cameras, that the user is proceeding toward the destination.

14. The system of claim 8, wherein the set of notification options includes initiating a notification to a notification device of a bystander, the bystander included in the second set of images.

15. A computer program product comprising a computer readable storage medium having program instructions embodied therewith, wherein the computer readable storage medium is not a transitory signal per se, the program instructions executable by a processor to cause the processor to perform a method for generating a summary text composition, the method comprising:
obtaining notification data for a user;
obtaining a first set of images of the user from one or more cameras, the one or more cameras independent of the user and a user device of the user;
identifying, based on the first set of images, a first status of the user;
generating a set of notification options based, at least in part, on the first status of the user;
selecting a first notification option of the set of notification options, the first notification option associated with the user device of the user;
initiating, in response to the selecting, a first notification by the first notification option;
determining, at a first time, that the user does not acknowledge the first notification;
obtaining, in response to the determining, a second set of images of the user from the one or more cameras independent of the user and the user device;
identifying, based on the second set of images, a second status of the user;
selecting at least one second notification option of the set of notification options, the second notification option selected for one or more devices independent of the user device to transmit a notification associated with the first notification; and
initiating, in response to the selecting the at least one second notification option, at least one second notification by the at least one second notification option.

16. The computer program product of claim 15, wherein the one or more cameras are surveillance cameras for an environment in which the user is located.

17. The computer program product of claim 15, further comprising calculating a step time, and
wherein the step time is a time interval between the initiating the first notification and the initiating the at least one second notification.

18. The computer program product of claim 17, wherein the notification data includes an acknowledgment-time threshold; and
wherein the calculating the step time comprises dividing the acknowledgment-time threshold by a count of notification options included in the set of notification options.

19. The computer program product of claim 15, further comprising determining, at a second time subsequent to the first time, that the user acknowledges the at least one second notification; and
refraining from initiating a third notification in response to the determining at the second time.

20. The computer program product of claim 19, wherein the notification data includes a destination for the user; and
wherein the determining that the user acknowledges the at least one second notification comprises determining, based on a third set of images of the user obtained from the one or more cameras, that the user is proceeding toward the destination.

\* \* \* \* \*